C. R. BRYANT.
PACKING RING.
APPLICATION FILED OCT. 23, 1915.
1,309,609.
Patented July 15, 1919.
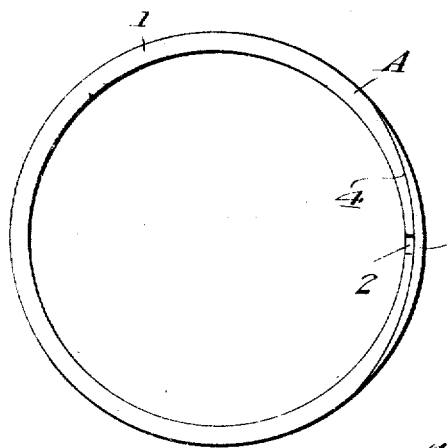
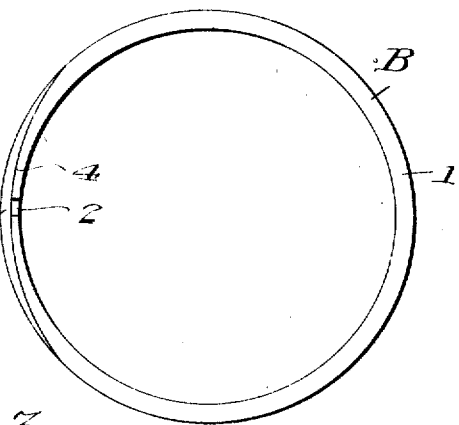
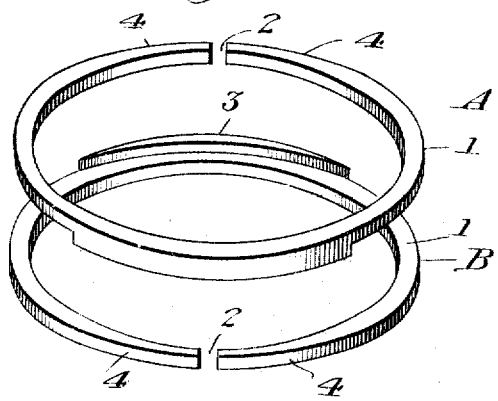
Inventor
C. R. Bryant

UNITED STATES PATENT OFFICE.

CLARENCE R. BRYANT, OF MEMPHIS, TENNESSEE, ASSIGNOR, BY MESNE ASSIGNMENTS, TO BROWNLOW BYRNS, OF CHICAGO, ILLINOIS.

PACKING-RING.

1,309,609.     Specification of Letters Patent.     Patented July 15, 1919.

Application filed October 23, 1915. Serial No. 57,536.

*To all whom it may concern:*

Be it known that I, CLARENCE R. BRYANT, a citizen of the United States, residing at Memphis, in the county of Shelby and State of Tennessee, have invented new and useful Improvements in Packing-Rings, of which the following is a specification.

This invention relates to packing rings and has for its object to produce a packing ring for the pistons of engines embodying twin members of novel formation and relation to each other whereby there is presented an outer circumferential surface or working face which is entirely free from open joints through which pressure or fluid may escape and thereby enabling the ring to efficiently hold compression by insuring against leakage, the construction of the ring as a whole also preventing the scoring of the cylinder wall.

A further object of the invention is to produce two members which are identical in form, size and weight, resulting in a perfectly balanced ring, the members of which are so formed as to prevent any relative rotative movement thereof, thereby eliminating the necessity of using a dowel pin or like expedient while presenting an endless or continuous unbroken working face.

With the above and other objects in view, the invention consists in the novel construction, combination and arrangement of parts, as herein described, illustrated and claimed.

In the accompanying drawings:—

Figure 1 is a plan view looking toward one face of the complete ring.

Fig. 2 is a plan view looking toward the opposite face of the ring.

Fig. 3 is a perspective view showing the members of the ring separated.

The ring contemplated in this invention comprises twin members designated at A and B. Each member comprises a body 1 which is split as shown at 2. Each member is also provided along the meeting face thereof with an eccentric or crescent-shaped flange 3 projecting sufficiently to fully overlap the end portions of the other member, the end portions of both members being also tapered and eccentric as shown at 4 to agree with the curvature of the inner surface of the flange 3 of the opposing members.

The twin members when assembled are reversely disposed to each other, the split in one member occurring centrally of the flange 4 of the other member, the gap between the extremities of each member being thus covered and closed by the flange of the other member.

When the two members are associated in their proper relation to each other, a complete ring of uniform thickness is produced and the outer surface of the complete ring is not interrupted or broken by any joints but presents a practically continuous or endless working face avoiding any leakage of compression between the packing ring and the cylinder wall and also preventing scoring of the cylinder wall. Furthermore, by reason of the eccentric meeting faces of the flanges 4 and the end portions of the members, relative rotative movement of said members to each other is prevented without the necessity of employing a dowel pin or similar expedient. The packing ring hereinabove described is especially adapted for use in connection with the pistons of engines or pumps of any kind requiring high compression and a fluid tight contact between the piston and cylinder wall.

Having thus described my invention, I claim:—

1. A packing ring, comprising a plurality of split members, one of the same being formed on its lateral meeting face with a projecting flange, and said members being disposed to one another so that said flange overlaps exteriorly the end portions of another member.

2. A packing ring, comprising two split members, one of the same being formed on its lateral meeting face with a projecting flange, the members being disposed reversely to each other with said flange overlapping exteriorly the end portions of the other member.

3. A packing ring, comprising a plurality of split members, each formed on its lateral meeting face with a projecting flange, said members being disposed to one another so that the flange of one member overlaps exteriorly the end portions of another member.

4. A packing ring, comprising two split members, each formed on its lateral meeting face with a projecting flange, the members being disposed reversely to each other with the flange of one member overlapping exteriorly the end portions of the other member.

5. A packing ring, comprising two split members, each formed on its lateral meeting face with a projecting flange having an inner eccentric face, the members being disposed reversely to each other with the eccentric face of the flange of one member overlapping the end portions of the other member.

In testimony whereof I affix my signature in presence of two witnesses.

CLARENCE R. BRYANT.

Witnesses:
  E. BOWEN,
  M. E. KAUFMAN.

Correction in Letters Patent No. 1,309,609.

It is hereby certified that the name of the assignee in Letters Patent No. 1,309,609, granted July 15, 1919, upon the application of Clarence R. Bryant, of Memphis, Tennessee, for an improvement in "Packing-Rings," was erroneously written and printed as Brownlow Byrns, whereas said name should have been written and printed as *Brownlow Byrn*, as shown by the records of assignments in this office; and that the said Letters Patent should be read with this correction therein that the same may conform to the record of the case in the Patent Office.

Signed and sealed this 28th day of October, A. D., 1919.

[SEAL.] 
M. H. COULSTON,
*Acting Commissioner of Patents.*

Cl. 21—108.